W. W. STEVENS.
COFFEE-POT.

No. 172,670.  Patented Jan. 25, 1876.

Witnesses:—
Frank H. Jordan.
Edwin W. Haskell.

Inventor:—
William W. Stevens,
per Wm. Henry Clifford
atty.

UNITED STATES PATENT OFFICE

WILLIAM W. STEVENS, OF PORTLAND, MAINE, ASSIGNOR TO WESTBROOK BRITANNIA COMPANY, OF SAME PLACE.

IMPROVEMENT IN COFFEE-POTS.

Specification forming part of Letters Patent No. 172,670, dated January 25, 1876; application filed May 31, 1875.

*To all whom it may concern:*

Figure 1:
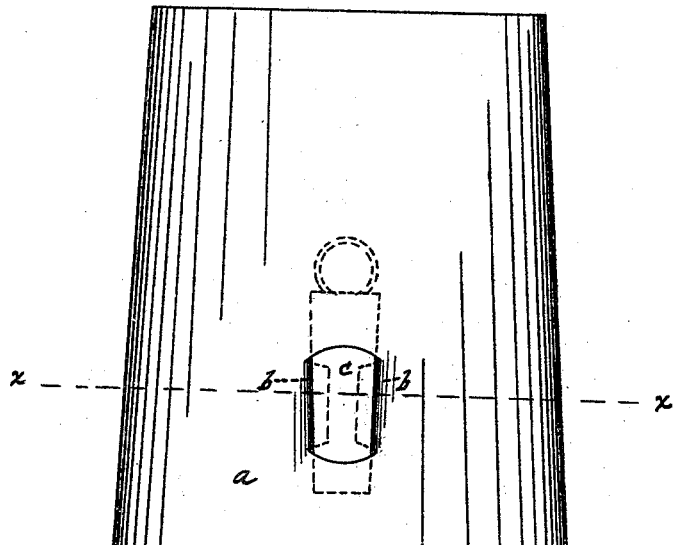
Figure 2:

Be it known that I, WILLIAM W. STEVENS, of Portland, in the county of Cumberland and State of Maine, have invented certain new and useful Improvements in Tea and Coffee Pots; and I do hereby declare that the following is a full, clear, and exact description thereof, which will enable others skilled in the art to which it pertains to make and use the same, reference being had to the accompanying drawings, and to the letters of reference marked thereon, which form part of this specification:

Figure 1 is a side elevation of the body of a tea or coffee pot, with my improvement in place. Fig. 2 is a detail view in section on line $x$ $x$, Fig. 1.

Same letters show like parts.

The present invention has for its object an improvement in the construction or manufacture of metallic tea or coffee pots; and consists more particularly in constructing or forming the flanges, which hold or secure the strainer in place, of one and the same piece of metal of which the body proper is made, and identical therewith, and in the general combination and adaptation of the several parts or features of the coffee or tea pot, whereby a very perfect and cheap device is afforded, all as will now be more in detail set out and explained.

In the accompanying drawing, $a$ shows the body of the pot, $b$ the flanges thereon, which aid in holding the slide or strainer $c$ in position. Heretofore, in order to hold this strainer in position guides were soldered to the inside of the body of the pot on each side of the opening leading to the nozzle, and in these guides worked the removable strainer before mentioned.

By the use of my improvement I obviate this necessity by simply forming, by the employment of suitable dies, the requisite guides from the metal composing the body of the pot.

In order to accomplish this result I make a wedge-shaped opening in the body of the pot, leaving projecting parts or flanges $b$, as shown. These flanges are depressed or struck inward by suitable dies, so that the wedge-shaped removable strainer may be slid down from the inside, and be held in place by these flanges, which rest against the inside of the strainer, as shown in Fig. 2, and indicated in dotted lines in Fig. 1.

I do not claim a removable strainer, neither do I claim holding the said strainer in position by the use of flanges soldered to the sides of the opening to which the nozzle is attached.

My invention seeks to provide a simple and economical method of holding the strainer in place by a part of the metal which composes the body of the pot.

It is evident that the lower part or bottom of the opening can be bent in so that the end of the strainer can rest upon it, and when this is done a wedge-shaped opening is not necessary, but it can have upright sides.

What I claim as my invention, and desire to secure by Letters Patent, is—

1. In a tea or coffee pot, the flanges $b$, struck up or from the metal forming the body, substantially as and for the purposes set forth.

2. The combination of a body, $a$, having the struck-up flanges $b$, with the movable strainer $c$, substantially as described.

In testimony that I claim the foregoing as my own I affix my signature in presence of two witnesses.

W. W. STEVENS.

Witnesses:
 WM. HENRY CLIFFORD,
 FRANK H. JORDAN.